United States Patent
Lebeau et al.

(10) Patent No.: US 8,775,156 B2
(45) Date of Patent: Jul. 8, 2014

(54) TRANSLATING LANGUAGES IN RESPONSE TO DEVICE MOTION

(75) Inventors: Michael J. Lebeau, Palo Alto, CA (US); John Nicholas Jitkoff, Palo Alto, CA (US)

(73) Assignee: Google Inc., Mountain View, CA (US)

(*) Notice: Subject to any disclaimer, the term of this patent is extended or adjusted under 35 U.S.C. 154(b) by 21 days.

(21) Appl. No.: 12/851,083

(22) Filed: Aug. 5, 2010

(65) Prior Publication Data

US 2012/0035907 A1  Feb. 9, 2012

(51) Int. Cl.
*G06F 17/28* (2006.01)

(52) U.S. Cl.
CPC .............. *G06F 17/289* (2013.01); *G06F 17/28* (2013.01)
USPC ........................................ 704/3; 704/2; 704/4

(58) Field of Classification Search
CPC ................................ G06F 17/28; G06F 17/289
USPC .............................................. 704/2, 3, 4, 5, 8
See application file for complete search history.

(56) References Cited

U.S. PATENT DOCUMENTS

| | | | | |
|---|---|---|---|---|
| 5,715,466 | A * | 2/1998 | Flanagan et al. | 704/5 |
| 6,161,082 | A * | 12/2000 | Goldberg et al. | 704/3 |
| 6,266,642 | B1 * | 7/2001 | Franz et al. | 704/277 |
| 7,236,922 | B2 * | 6/2007 | Honda et al. | 704/2 |
| 7,310,605 | B2 * | 12/2007 | Janakiraman et al. | 704/277 |
| 7,460,884 | B2 | 12/2008 | Sinclair et al. | |
| 7,539,619 | B1 * | 5/2009 | Seligman et al. | 704/277 |
| 7,873,532 | B2 * | 1/2011 | Jones et al. | 705/7.42 |
| 8,386,231 | B2 | 2/2013 | LeBeau et al. | |
| 2002/0120436 | A1 * | 8/2002 | Mizutani et al. | 704/2 |
| 2003/0097250 | A1 * | 5/2003 | Chino | 704/1 |
| 2003/0120478 | A1 * | 6/2003 | Palmquist | 704/3 |
| 2003/0149557 | A1 * | 8/2003 | Cox et al. | 704/2 |
| 2004/0102201 | A1 * | 5/2004 | Levin | 455/466 |
| 2004/0122677 | A1 * | 6/2004 | Lee et al. | 704/277 |
| 2004/0172257 | A1 * | 9/2004 | Liqin et al. | 704/277 |
| 2004/0243392 | A1 | 12/2004 | Chino et al. | |
| 2004/0267527 | A1 * | 12/2004 | Creamer et al. | 704/235 |
| 2005/0131673 | A1 | 6/2005 | Koizumi et al. | |
| 2005/0192714 | A1 * | 9/2005 | Fong et al. | 701/1 |
| 2005/0261890 | A1 | 11/2005 | Robinson | |
| 2005/0283365 | A1 * | 12/2005 | Mizutani et al. | 704/257 |
| 2006/0271349 | A1 * | 11/2006 | Scanlan | 704/2 |
| 2006/0271350 | A1 * | 11/2006 | Chino et al. | 704/2 |
| 2006/0293876 | A1 * | 12/2006 | Kamatani et al. | 704/2 |
| 2007/0015494 | A1 | 1/2007 | Sinclair et al. | |
| 2007/0043567 | A1 * | 2/2007 | Gao et al. | 704/257 |
| 2007/0150278 | A1 * | 6/2007 | Bates et al. | 704/257 |
| 2008/0077390 | A1 * | 3/2008 | Nagao | 704/7 |
| 2008/0091407 | A1 * | 4/2008 | Furihata et al. | 704/4 |

(Continued)

OTHER PUBLICATIONS

Waibel et al. "Speechalator: Two-Way Speech-to-Speech Translation in Your Hand", Proceedings of HLT-NAACL 2003.*

(Continued)

*Primary Examiner* — Jialong He
(74) *Attorney, Agent, or Firm* — Fish & Richardson P.C.

(57) ABSTRACT

A method, performed on a server, of translating between languages includes receiving first audio data for a first language from a mobile device, translating the first audio data to second audio data for a second language, receiving an indication that the mobile device has moved between two locations, and sending the second audio data to the mobile device in response to the indication.

19 Claims, 10 Drawing Sheets

(56) References Cited

U.S. PATENT DOCUMENTS

| | | | |
|---|---|---|---|
| 2008/0133245 A1* | 6/2008 | Proulx et al. | 704/277 |
| 2008/0177528 A1* | 7/2008 | Drewes | 704/2 |
| 2008/0214160 A1 | 9/2008 | Jonsson | |
| 2008/0221862 A1 | 9/2008 | Guo et al. | |
| 2008/0288474 A1* | 11/2008 | Chin et al. | 707/4 |
| 2009/0048821 A1 | 2/2009 | Yin et al. | |
| 2009/0075634 A1 | 3/2009 | Sinclair et al. | |
| 2009/0177461 A1* | 7/2009 | Ehsani et al. | 704/2 |
| 2009/0222257 A1* | 9/2009 | Sumita et al. | 704/3 |
| 2009/0271178 A1* | 10/2009 | Bodin et al. | 704/8 |
| 2009/0281789 A1 | 11/2009 | Waibel et al. | |
| 2010/0030549 A1 | 2/2010 | Lee et al. | |
| 2010/0057435 A1* | 3/2010 | Kent et al. | 704/3 |
| 2011/0054830 A1* | 3/2011 | Logan | 702/141 |

OTHER PUBLICATIONS

Wahlster, "Mobile Speech-to-Speech Translation of Spontaneous Dialogs: An Overview of the Final Verbmobil System", In Verbmobil: Foundations of Speech-to-Speech Translation, pp. 3-21, published by Springer Press, 2000.*

Tofel, K., "Your Next Smartphone Could be a Universal Translator" [online] Retrieved from the Internet:<URL: http://jkontherun.com/2010/03/03/language-translation-phone/>, [retrieved on Jul. 22, 2010], dated Mar. 3, 2010.

"Speaking Universal Translator for Android" [online] Retrieved from the Internet:<URL http://www.androidzoom.com/android_applications/travel/speaking-universal-translator_iabk.html>, [retrieved on Jul. 22, 2010], dated Jul. 15, 2010.

DARPA: Information Processing Techniques Office, "Spoken Language Communication and Translation System for Tactical Use (TRANSTAC)", [online] Retrieved from the Internet:URL:http://www.darpa.mil/ipto/programs/transtac/transtac.asp, [retrieved on Jul. 22, 2010].

"Global Talking Translator for 7 Languages / ENTOURAGE7", [online] Retrieved from the Internet: <URL: http://www.nyrius.com/entourage7.php> , [retrieved on Jul. 22, 2010].

Posting by Matson, A. on TalkAndroid.com, "App of the Future Here Today, Real time language translator for Android", [online] Retrieved from the Internet: <URL: http://www.talkandroid.com/6943-app-of-the-future-here-today-realtime-language-translator-for-android>, [retrieved on Jul. 22, 2010].

Toto, S., "Toshiba works on instant voice translation software for cell phones", [online] Retrieved from the Internet: <URL: http://techcrunch.com/2010/01/06/toshiba-works-on-instant-voice-translation-software-for-cell-phones/>, (posted Jan. 2010).

Accelerometer, From Wikipedia, [online], retrieved from http://www.archive.org, archived Feb. 11, 2010.

Office Action in U.S. Appl. No. 13/249,129, dated Dec. 1, 2011.

Search Report mailed Dec. 16, 2013 in corresponding European application No. 11815183.6, 6 pgs.

International Preliminary Report on Patentability in Application No. PCT/US2011/046249, (incl. Written Opinion) dated Feb. 5, 2013.

Reply to Office Action in U.S. Appl. No. 13/249,129, filed Feb. 29, 2012.

Interview Summary in U.S. Appl. No. 13/249,129, dated Mar. 1, 2012.

Notice of Allowance issued in U.S. Appl. No. 13/249,129, dated Mar. 20, 2012.

International Search Report and Written Opinion in Application No. PCT/US2011/046249, dated Mar. 2, 2012.

* cited by examiner

TRANSLATING LANGUAGES IN RESPONSE TO DEVICE MOTION

TECHNICAL FIELD

This patent application generally describes using a mobile device, such as a mobile telephone, to enable language translation.

BACKGROUND

The concept of electronic language translation has been around since at least the 1980's. For example, "Star Trek: The Next Generation" featured a fictitious "universal" translator that automatically translated a character's spoken language into the language of its target audience, and vice versa.

Today, the capabilities of computer hardware have evolved to a point where electronic language translation is a reality. In the mobile realm, for example, DLP MOBILE recently released the "Speaking Universal Translator". This application, or "app", allows two users to communicate with each other in their own languages using a mobile telephone. Referring to FIG. 1, the "Speaking Universal Translator" allows a user to select languages for translation from among a list of supported languages. In the example of FIG. 1, the selected languages are English 10 and Italian 11, which are represented by American and Italian flags, respectively. Before speaking in, e.g., English, a user touches the microphone icon 12 on the English-side 14 of touch screen 15. The user then speaks into the mobile telephone. In response, English text corresponding to the user's speech is displayed in the English text field 16. Italian text corresponding to the user's speech translated into Italian is displayed in Italian text field 17, and Italian speech is output from the mobile telephone. A second user, e.g., an Italian speaker, may respond by touching the microphone icon 19 on the Italian-side 20 of the touch screen 11, and speaking Italian into the mobile telephone. In this case, the process is repeated so that the output from the mobile telephone is English text and English speech.

SUMMARY

In general, this patent application described techniques for translating between languages. An example of such a technique includes receiving first audio data for a first language from a mobile device, translating the first audio data to produce second audio data for a second language, receiving an indication that the mobile device has moved between two locations, and sending the second audio data to the mobile device in response to the indication. This example may include one or more of the following features, or any others described in this patent application, either alone or in combination.

Translating the first audio data to produce second audio data may include generating first text in the first language based on the first audio data, translating the first text to second text in the second language, and generating the second audio data from the second text.

The foregoing example may also include sending the first text or the second text to at least one of the mobile device and a computer, identifying a geographic location of the mobile device, and/or designating the first language based on the geographic location. After sending the second audio, a request from the mobile device may be received for a different translation of the first audio data.

The foregoing example may include providing language options to the mobile device, receiving one or more selections from among the language options, and designating one or more of the first language and the second language based on the one or more selections. The designation of one or more of the first language and the second language may be performed via a voice command.

Another example of a technique for translating between languages includes actions performed at a server and at a mobile device. The actions performed at the server may include receiving first audio data for a first language from the mobile device, translating the first audio data to produce second audio data for a second language, and sending the second audio data to the mobile device. The actions performed at the mobile device may include storing the second audio data, detecting motion of the mobile device, and playing the second audio data in response to the motion. This example may include one or more of the following features, or any others described in this patent application, either alone or in combination.

Translating the first audio data to produce second audio data may include generating first text in the first language based on the first audio data, translating the first text to second text in the second language, and generating the second audio data from the second text.

The foregoing example may include sending the first text or the second text to at least one of the mobile device and a computer, identifying a geographic location of the mobile device, and/or designating at least one of the first language and the second language based on the geographic location.

Another example of a technique for translating between languages includes associating mobile devices with each other, where each of the mobile devices is configured to operate as a source of audio data and as a destination for audio data, receiving first audio data for a first language from a first of the mobile devices, translating the first audio data to produce second audio data for a second language, and sending the second audio data to a second of the mobile devices. In this example, the first of the mobile devices and the second of the mobile devices are different mobile devices. This example may include one or more of the following features, or any others described in this patent application, either alone or in combination.

Translating the first audio data to produce second audio data may include generating first text in the first language based on the first audio data, translating the first text to second text in the second language, and generating the second audio data from the second text.

This example may also include sending the first text or the second text to at least one of the first of the mobile devices, the second of the mobile devices, and a computer, identifying a geographic location of the first of the mobile devices and/or the second of the mobile devices, and/or designating at least one of the first language and the second language based on the geographic location.

All or part of the foregoing techniques may be implemented as a computer program product that includes instructions that are stored on one or more non-transitory machine-readable storage media, and that are executable on one or more processing devices. All or part of the foregoing techniques may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein are processes for translating languages using a mobile computing device (or simply "mobile device"). According to one such process, a first user speaks into a mobile device in one language, such as English. The resulting audio file is sent to a server for translation into a second language, such as French. The first user passes the mobile device to a second user. In response to passage of the mobile device, an audio file containing the translation in the second language is retrieved and played on the mobile device to the second user.

Figure 1:
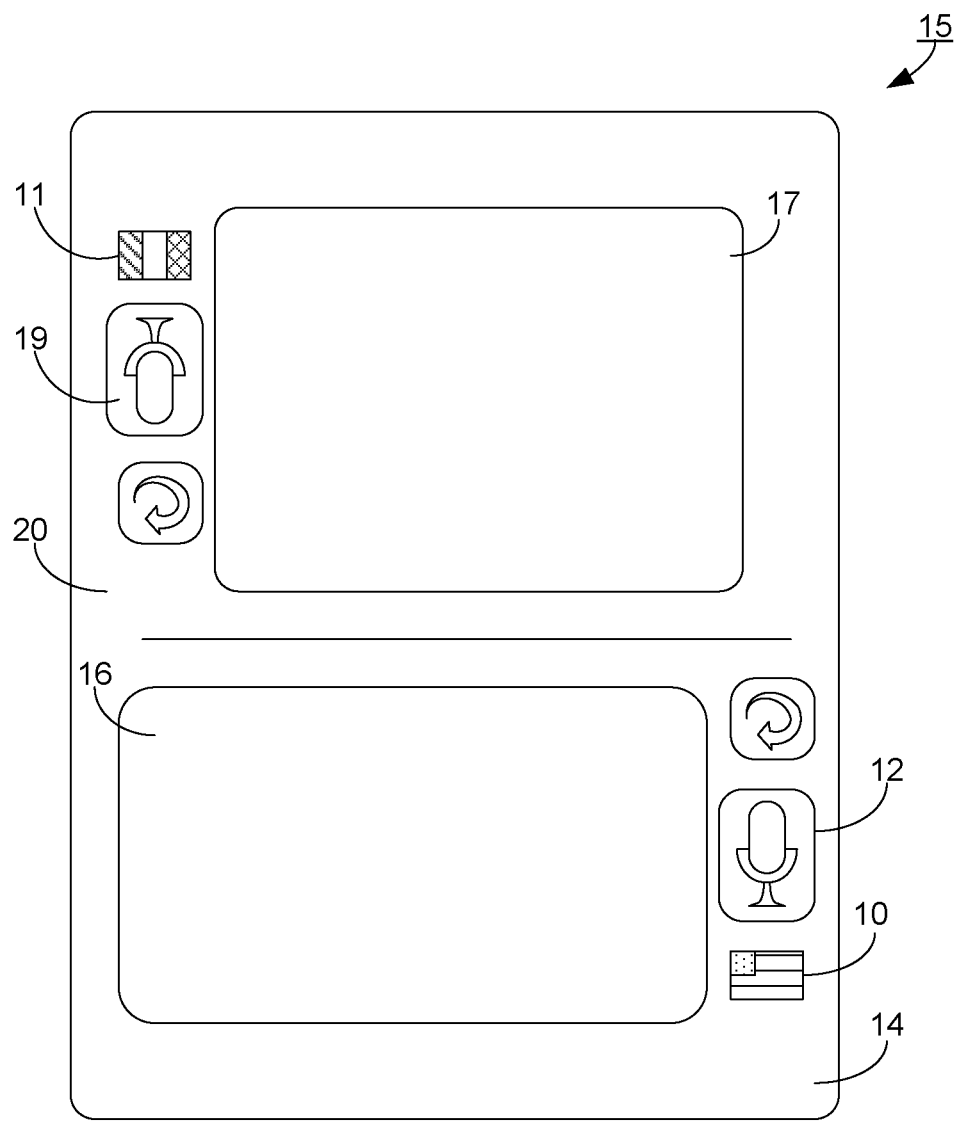
FIG. 1 is a block diagram of a prior art language translation interface.
Figure 2:
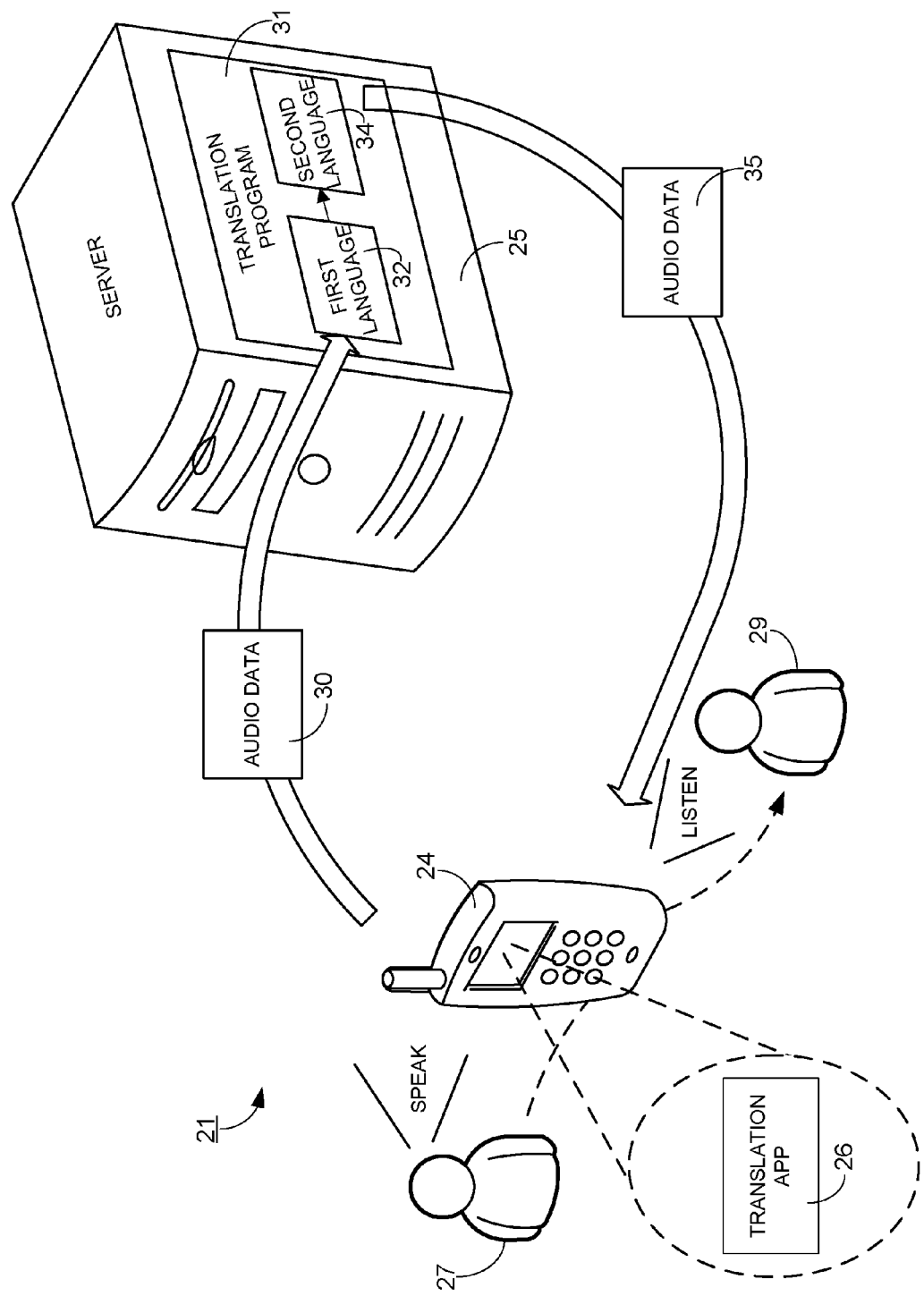
FIG. 2 is a block diagram showing, conceptually, use of a mobile device to enable language translation.

FIG. 2 is a block diagram showing the foregoing process conceptually. Specifically, FIG. 2 is a block diagram showing use of a mobile device to enable language translation. FIG. 2 shows a system 21 that includes a mobile device 24 in communication with a server 25 over a network. In this example, the mobile device is a cellular telephone having advanced computing capabilities, which is known as a smartphone. Mobile device 24 contains an application ("app") 26 for translating between languages. Users 27 and 29 activate this translation app to initiate language translation. In one example, the app will ask the users which languages to translate. The users may select, e.g., via a touch-screen menu item or voice input, to translate between their native languages, in this example, English and French. Alternatively, the geographic location of mobile device 24 may be used to specify one (or both) of the languages, as described below.

To begin the translation process, user 27 speaks in his native language (e.g., English) into mobile device 24. Translation app 26 generates audio data 30 that corresponds to that speech, and forwards that audio data to server 25. Translation program 31 running on server 25 translates the audio data for the user's native language 32 (e.g., English) into audio data 35 for the other user's native language 34 (e.g., French). Mobile device 24 is passed from one user 27 to the other user 29. Audio data 35 is provided to mobile device 24 over the network. User 29, whose native language is French, then listens to audio data 35 on mobile device 24.

By using mobile device 24 in this manner, user 29 is able to obtain a French-language translation of user 27's English-language speech. User 29 may then speak, in French, into mobile device 24. The process may then be repeated in reverse to convert user 29's French-language speech into English-language speech, which can be played to user 27 on mobile device 24. By passing mobile device 24 back-and-forth between users 27 and 29, the two can carry-on a conversation in their native languages through device 24. As described below, the passages of mobile device 24 may be the automatic trigger for audio playback to each user. That is, the audio data for a target language may be retrieved for playback in response to detected motion of mobile device 24. In an implementation, audio data 35 is stored on server 25, and is retrieved from there by translation app 26 for playback in response to the detected motion. In another implementation, audio data 35 is stored in memory on mobile device 24, and is retrieved from there by translation app 26 in response to the detected motion.

Using the motion of the mobile device as the trigger for audio playback may make the translation process more user-friendly, and may reduce the amount of interaction with the translation app. The motion of the mobile device may be detected, e.g., by an accelerometer built into the mobile device, and relayed to translation app 26 to trigger audio playback. In one example, a change in location of the mobile device may be determined by detecting that a vector normal to the face of the mobile device has passed through one or more planes (e.g., a vertical plane and/or a horizontal plane). In this way, it is possible to determine if the mobile device has been flipped and/or rotated through a predefined angle, thereby indicating that the device has passed from one user to another user.

Figure 3:
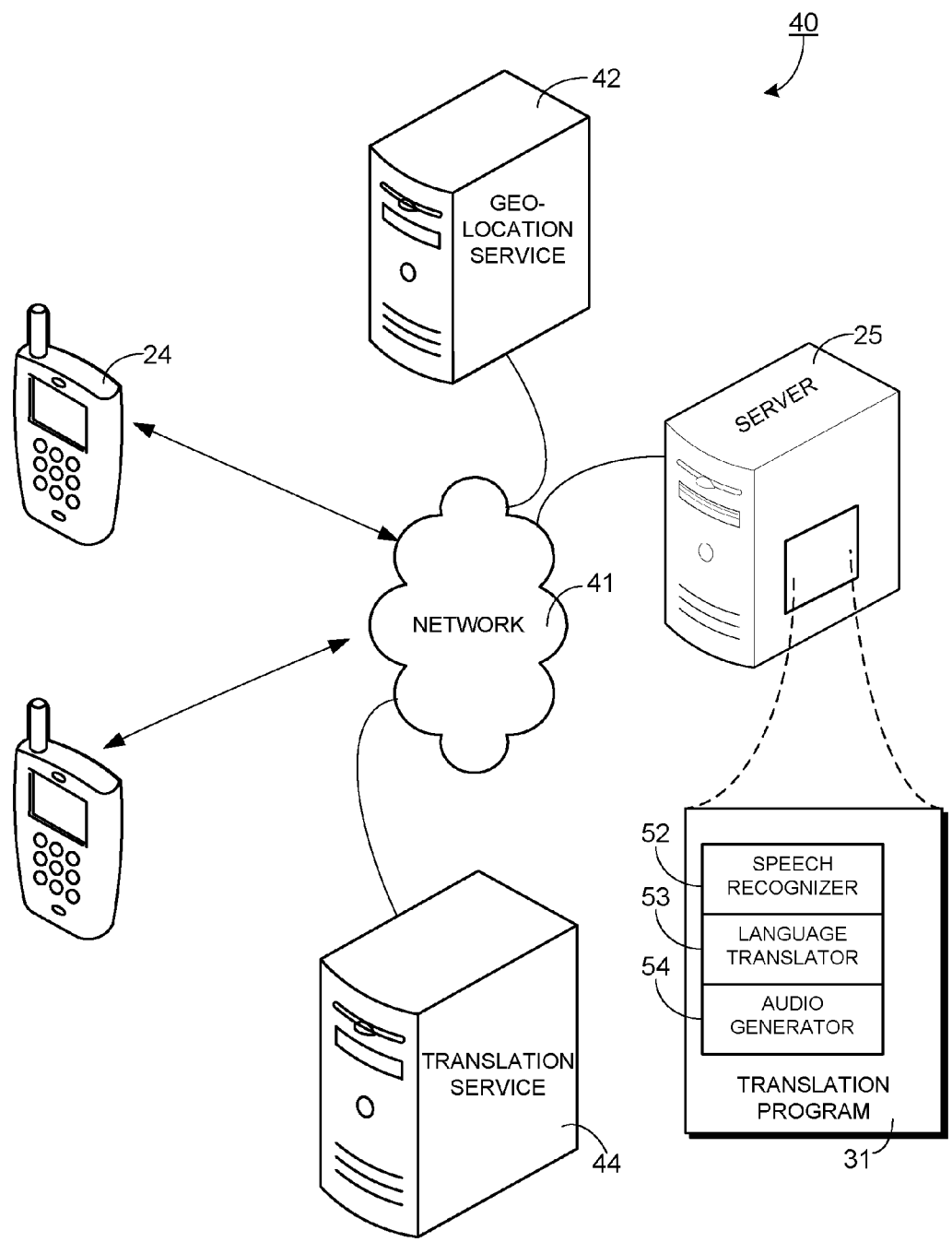
FIG. 3 is a block diagram of a network system on which the process depicted in FIG. 2 may be implemented.

FIG. 3 shows a network system 40, on which the process depicted in FIG. 2 may be implemented. Network system 40 includes mobile device 24 and others, a network 41, a server 25, and connections to various services including, but not limited to, a geographic location service 42 and a translation service 44.

Figure 4:
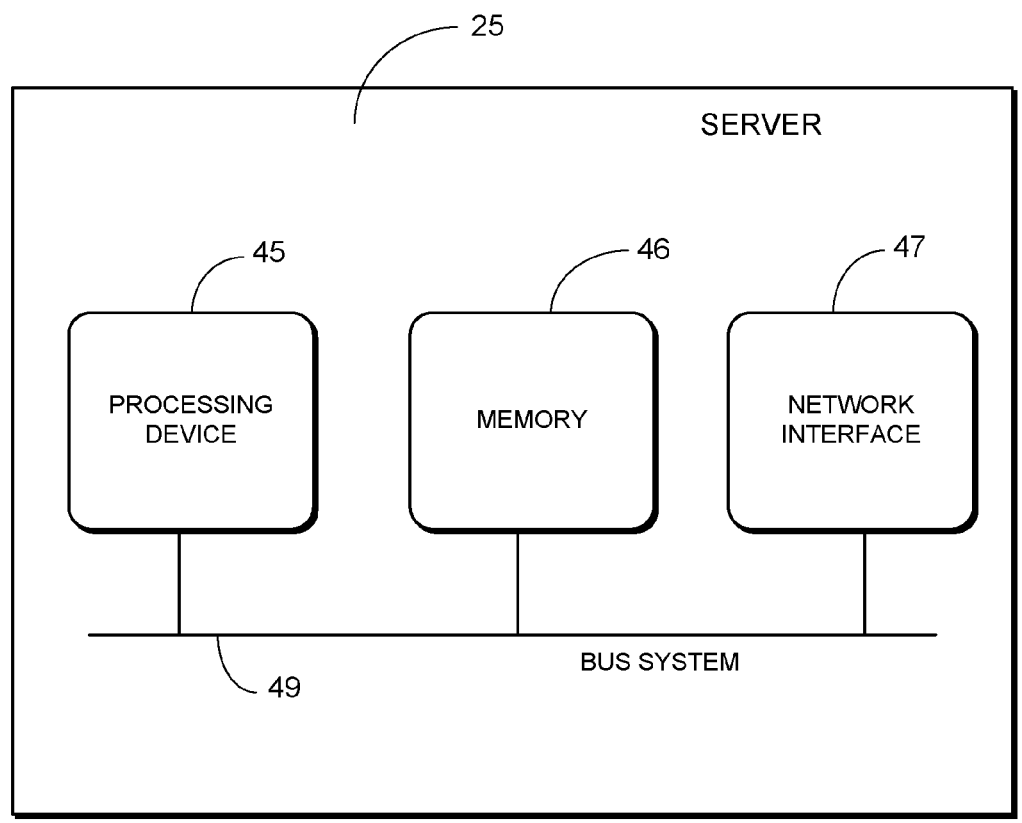
FIG. 4 is a block diagram of an architecture of a server that may be included in the network system of FIG. 3.

Server 25 may be a single server or a group of servers that are at a same location or at different locations. FIG. 4 is a block diagram of a server 25. Server 25 includes a processing device 45, memory 46, and a network interface 47. A bus system 49, including, for example, a data bus and a motherboard, can be used to establish and control data communication between the components of server 25.

Processing device 45 may include one or more microprocessors. Generally speaking, processing device 45 may include any appropriate processor and/or logic that is capable of receiving and storing data, and of communicating over network 41. Memory 46 can include a hard drive and a random access memory storage device, such as a dynamic random access memory, or other types of non-transitory machine-readable storage devices. As shown in FIG. 3, memory 46 stores computer programs that are executable by processor 45. Among these computer programs is translation program 31. As explained below, translation program 31 translates audio data from one language to produce audio data in another language. This "other" language maybe referred to as a "target" language.

Translation program 31 may include computer programs that are used to implement the language translation process described herein. These programs may be separate routines or subroutines of the same program. In one implementation, these programs include a speech recognizer 52, a language translator 53, and an audio generator 54.

Speech recognizer 52 receives audio data 30 and converts the audio data into text representing speech in the user's native language. Speech recognizer 52 may include subroutines for recognizing words, parts of speech, and the like. For example, the speech recognizer may include a speech segmentation routine for breaking sounds into sub-parts and using those sub-parts to identify words, a word disambiguation routine for identifying meanings of words, a syntactic lexicon to identify sentence structure, parts-of-speech, etc., and a routine to compensate for regional or foreign accents in the user's language. The text output by speech recognizer 52 may be a file containing text in a self-describing computing language, such as XML (eXtensible Markup Language) or a variant thereof. Self-describing computing languages may be useful in this context because they enable tagging of words, sentences, paragraphs, and grammatical features in a way that is recognizable to other computer programs. Thus, another computer program, such as language translator 53, can read the text file, identify, e.g., words, sentences, paragraphs, and grammatical features, and use that information as needed.

Language translator 53 reads the text file output by speech recognizer 52, and uses this text file in the user's native language (e.g., the language of user 27) to generate a text file for a pre-specified target language (e.g., the language of user 29). For example, language translator 53 may read an English-language text file and generate a French-language text file based on the English-language text file. Language translator 53 may include, or reference, an electronic dictionary that correlates the user's native language to the target language. Language translator 53 may also include, or reference, a syntactic lexicon in the target language to modify word placement in the target language relative to the native language, if necessary. For example, in English, adjectives typically precede nouns. By contrast, in some languages, such as French, (most) adjectives follow nouns. The syntactic lexicon may be used to set word order and other grammatical features in the target language based on, e.g., tags contained in the English-language text file. The output of language translator 53 may be a text file similar to that produced by the speech recognizer, except that it is in the target language. The text file may be in a self-describing computer language, such as XML or a variant thereof.

Audio generator 54 reads the text file output by language translator 53, and generates audio data based on text in the text file. Since the text file is organized according to the target language, the audio data generated is for speech in the target language. The audio data may be generated with one or more indicators to synthesize speech having accent or gender characteristics. For example, an indicator may specify, to the mobile device, that the resulting speech is for a man or woman. The accent may be specific to the mobile device on which the audio data is to be played. For example, if the language conversion is from French to English, and the mobile telephone is located in Australia, audio generator 54 may include an indicator to synthesize English-language speech in an Australian accent.

Figure 5:
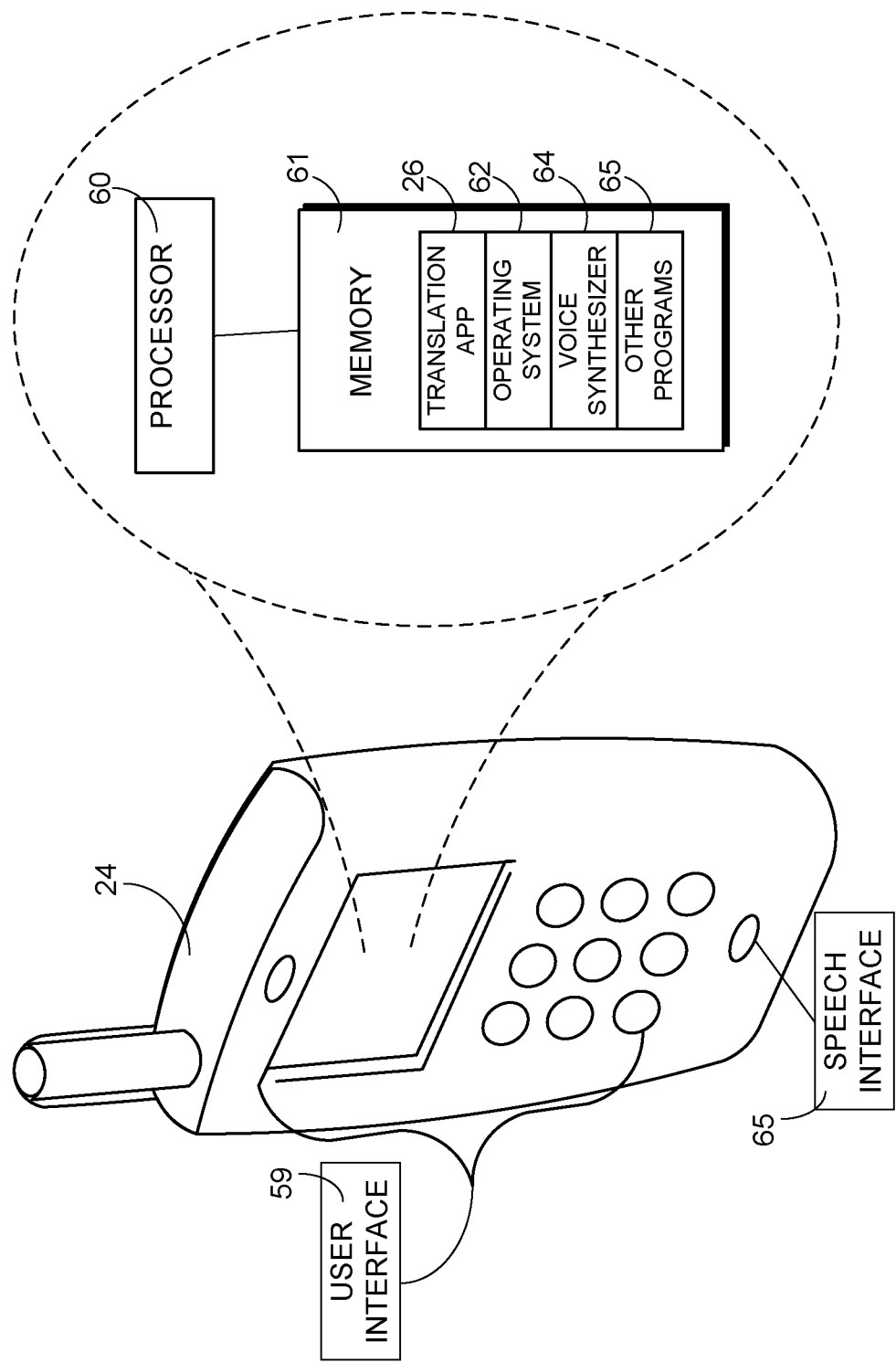
FIG. 5 is a block diagram of an architecture of a mobile device that may be included in the network system of FIG. 3.

Referring to FIG. 5, mobile device 24 may be a mobile telephone or smartphone and include a user input interface 59, such as a small QWERTY hardware keyboard, a touch-screen, and/or or a numeric keypad. Mobile device 24 may access network 41 using a wireless connection, such as a cellular telephone data connection, a Wi-Fi connection, or other wireless connection that can be used for sending data to, and receiving data from, devices on a network, such as server 25.

FIG. 5 is a block diagram of an architecture of a mobile device 24 that may be included in the network system of FIG. 3. In this example, mobile device 24 includes a processor 60 and memory 61 that stores the translation app 26, along with an operating system (OS) 62, a voice synthesizer 64, and other programs 65 that are executable on the mobile device. In this example, translation app 26 is for initiating a language translation process and, to the extent necessary, requesting and receiving user inputs relating to language translation. For example, the translation app may prompt a user to input languages to translate between, prompt users for their location(s), and provide users with translated text for one or more languages. Translation app 26 may be programmed into mobile device 24 at manufacture or it may be downloaded from a Web site by a user.

Mobile device 24 may also include a speech input interface 65 that receives an audio input from a user. For example, the speech input interface 65 can include a microphone that converts the sounds in the utterance from the user into audio data 30. The speech input interface 65 passes the audio data 30 to translation app 26, which forwards that data output, along with appropriate instructions, to translation program 31 running in server 25.

Referring back to FIG. 3, network 41 may include one or more networks, such as a local area network, a wide area network, and/or the Internet. One or more of the networks in the network 41 may be wireless, such as a cellular telephone network or a Wi-Fi network.

Various services are accessible via network 41. For example, translation program 31 can access a translation service 44 and a geographic location service 42. Translation service 44 may be a site for a translation firm. As described below, the translation firm may be asked to provide a manual translation for audio input if a machine translation provided by translation program 31 is deemed unacceptable by a user. Geographic location (or "geo-location") service 42 can provide information on the location of mobile device 24. For example, as described below, translation app 26 may provide an option to use a local language as one of the translated languages, or it may use the local language as a default. Translation program 31 may contact translation service 44 to identify the location of the mobile device that is running translation app 26 in order to identify the appropriate local language. Any appropriate geographic location service may be used.

Figure 6:
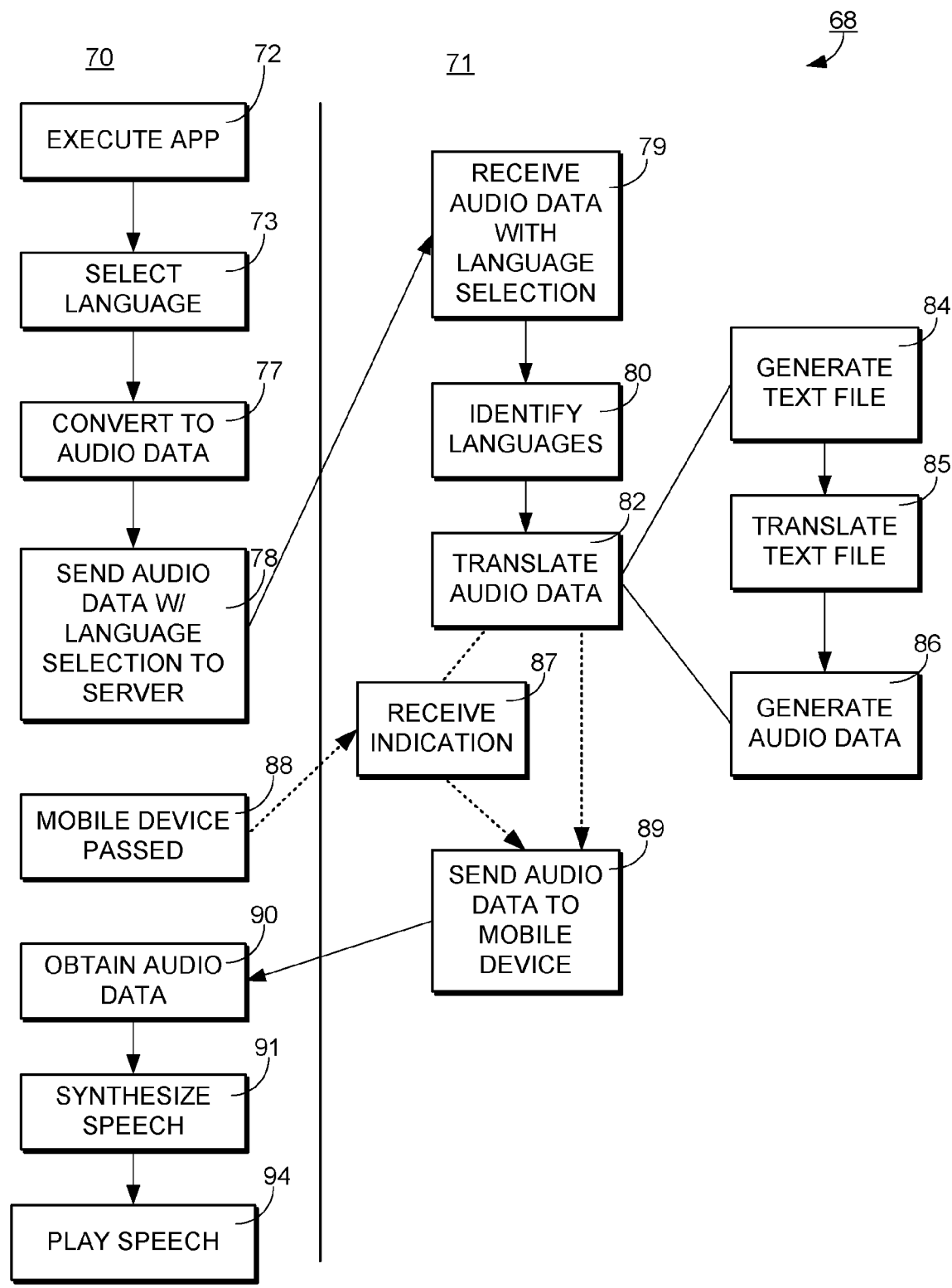
FIG. 6 is a flowchart showing a process for performing language translation.

FIG. 6 is a flowchart showing a process 68 for performing language translation. In FIG. 6, process 68 is split into a left part 70, which is performed on mobile device 24, and a right part 71, which is performed on server 25 (e.g., the left part, or a portion thereof, is performed by translation app 26 and the right part, or a portion thereof, is performed by translation program 31). Actions shown in FIG. 6 may be assigned differently. For example, in other implementations, actions performed by server 25 may be performed mobile device 24, and vice versa.

Figure 7:
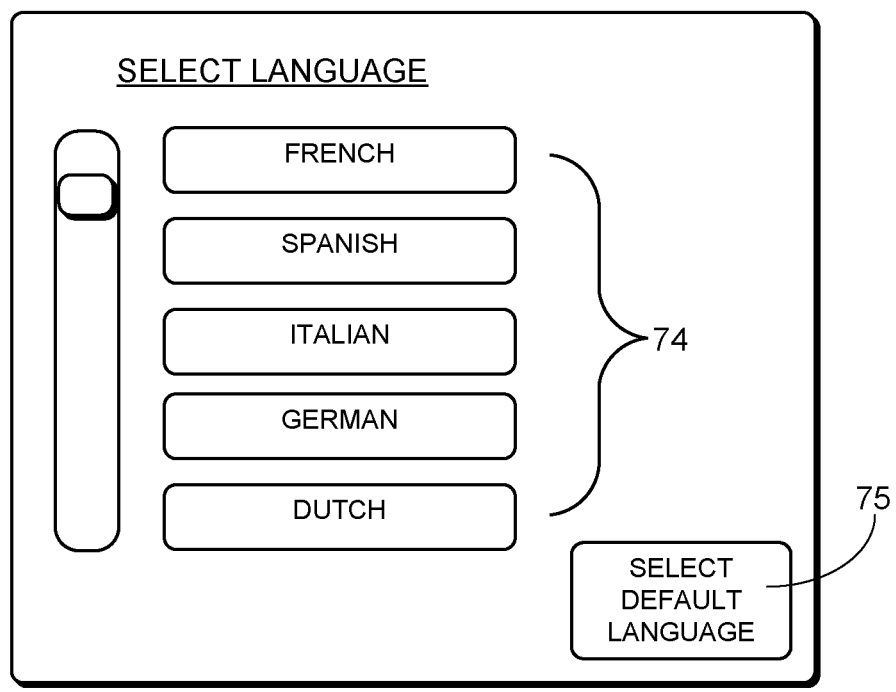
FIG. 7 shows an input screen for selecting languages in the process of FIG. 6.

Process 68 is initiated from mobile device 24. Specifically, a user executes (72) the language translation app 26 through voice or touch-screen input. Upon execution, language translation app 26 may provide an input screen, such as that shown in FIG. 7. In this regard, FIG. 7 shows an input screen for selecting language in the process of FIG. 6. From this point, a user may select (73) an initial language from a list 74 of supported languages. In this context, the initial language is the language that is first spoken into the mobile device. Again, voice or touch-screen inputs may be used to make the selection. Alternatively, the user may select a default language 75 to be the initial language. The default language may be the language that is spoken at the current geographic location of the mobile device. For example, if the mobile device is located in the United States, the default language may be English. The user also selects the target language. In this example, the target language is the language into which the initial language is to be translated. In this regard, the designations "initial" and "target" change as the mobile phone is passed between users. For example, if a first user speaks English into the mobile device, the initial language is English. The mobile device may then be passed to a second user to hear a French translation of the first user's English speech. Then, if the second user speaks French into the mobile device, the initial language becomes French and the target language becomes English, and so on.

According to process 68, mobile device 24 receives the first user's speech and converts (77) that speech to audio data. Translation app 26 obtains the audio data and sends (78) that audio data to translation program 31 in server 25 via network 41. Identifiers corresponding to the initial and target languages may be sent along with the audio data, or before or after the audio data. If a user has specified a default language, an indication to that effect may also be sent.

Translation program 31 in server 25 receives (79) the audio data and, if applicable, language identifiers from translation app 26. Translation program 31 identifies (80) the initial and target languages. This may be done simply by recognizing identifiers. If one of the language identifiers indicates a default language, translation program 31 may contact geographic location service 42 to identify the default language for the mobile device. To this end, translation program 31 may provide, to the translation service 44, the IP address of the mobile device, along with any other geographic indicia that it can infer from the audio data. The geographic location service 42 may respond to translation program 31 with the geographic location of mobile device 24. Translation program 31 may then consult a database or any other source to identify the primary language spoken at the geographic location of the mobile device. After the primary language has been identified, translation program 31 may prompt the user, via mobile device 24, to confirm that the default language that it has determined is acceptable. Likewise, if a location is known to be bilingual (e.g., Barcelona, Spain), translation program 31 may prompt the user to select an appropriate language from a list of languages spoken in a location (e.g., Catalan or Spanish for Barcelona). In a case such as this, both the initial and target languages may be selected based on geography.

In an alternative implementation, translation program may identify the initial and/or the target language based on the languages' vocabulary and/or syntax. For example, translation app 26 may prompt each user 27 and 29 to speak into mobile device 24. This speech may be translated into audio data streams that are identifiable by translation program 31. The vocabulary and syntax of each language may be used to identify each language to the translation program. This feature may be useful where a user (e.g., the owner 27 of the mobile device) is unsure of which language the other user is speaking. Tools for this type of recognition may be incorporated into translation program 31. Alternatively, translation program 31 may consult a service for this type of recognition that is accessible via network 41. If an incorrect language is selected, a user may have the option to instruct translation program 31 to "try again", e.g., to identify the next best candidate(s) for one (or both) languages. This may be repeated until the correct languages(s) are identified.

In any case, after translation program 31 has identified the initial and target languages, the audio data from mobile device 24 may be translated (82). To this end, speech recognizer 52 generates (84) a text file (e.g., an XML file) that corresponds to the received audio data. The text in the text file represents the user's speech in his native language (e.g., English). Language translator 53 translates (85) the text file into text for the target language (e.g., French). In the above example, the language translator 53 identifies the vocabulary and grammar of the English-language text contained in the text file generated by the speech recognizer 52. The language translator 53 uses the tools at its disposal to generate a text file (e.g., an XML file) containing a French-language translation of the English-language text. Audio generator 54 reads the text file generated by language translator 53, and uses the French-language text to generate (86) audio data that can be played to generate French speech for the text. As described above, the audio data may contain one or more indicators specifying how the French speech is to be synthesized from the audio data.

In an implementation, the generated audio data may be stored in server 25 until translation program 31 receives (87) an indication that the mobile device has been passed (88) from one user to another user. For example, as shown in the dotted portion of FIG. 6, translation app 26 may receive an indication, e.g., from translation app on mobile device 24 that mobile device 24 has been passed from one user 27 to another user 29. A predefined minimum amount of movement may be required by translation app 26 before it will output an indication that the mobile device has been passed. In any case, in response to passage of the mobile device from one user to another user, translation app 26 may output the indication to server 25 to send the generated audio data. Translation program 31 may receive this indication and, in response, send (89) the stored audio data (e.g., audio data 35 of FIG. 2) to mobile device 24.

In another implementation, translation program 31 may simply send (89) the generated audio data 35 to mobile device 24, thereby bypassing action 87 of FIG. 6. In an implementation like this, the generated audio data is stored in memory on mobile device 24. Translation app 26 may retrieve, from that memory, the audio data in response to detecting passage of mobile device from one user 27 to another user 29, as described above.

Mobile device 24 thus obtains (90) the generated audio data for the target language. Its voice synthesizer uses the generated audio data to synthesize (91) speech corresponding thereto. The voice synthesizer may use any indicators associated with the generated audio data to affect how the speech is synthesized (e.g., to provide a gender-specific or accent-specific speech type). Mobile device plays (94) the synthesized speech to the user. User 29 is thereby able to receive, in his native (or preferred) language, an audible translation of speech provided by user 27 in user 29's native (or preferred) language.

The foregoing process may be repeated, except in reverse. More specifically, user 29 may retain possession of mobile device 24 and, after hearing the translation, speak into mobile device 24 in his native language (e.g., French). In accordance with the process described above, this French-language speech may be translated to English-language speech, which may be played on mobile device 24 after mobile device 24 is passed back to user 27. Thereafter, user 27 may retain possession of mobile device 24 and, after hearing the French-language translation, speak into mobile device 24 in his native language, e.g., English. In accordance with the process described above, this speech may be translated into, e.g., French, and played on mobile device 24 after mobile device 24 is passed back to user 29. This back-and-forth process may continue so long as the two wish to converse.

Notably, neither user need interact with translation app 26 following the initial set-up actions 72, 73. That is, after translation app 26 has been executed, and translation program 31 identifies the two languages, the translation process is automatic from the point of view of the users. There need be no further instructions to, or control of, the translation app to continue translation. Simply passing the mobile device back-and-forth between users will continue the process.

Translation app 26 may provide an option to request an alternate translation than that provided by translation program 31. For example, if a user 29 is unable to understand the translation (e.g., the French-language speech), user 29 may request that an alternate translation be provided. This request may be via a touch-screen or audible command input to mobile device 24. In this regard, translation app 26 and translation program 31 may be configured to recognize audible commands as not being part of speech provided for translation. For example, a user may preface a command with a phrase that is unlikely to occur in normal speech or a number key that is likewise unlikely to occur. In any case, in response to a request for an alternate translation, translation program 31 may request a translation of the subject audio data from translation service 44. Translation service 44 may provide a more robust machine-language translation than that provided by translation program 31, or it may employ an actual person to perform the translation or to correct the machine-generated translation. Alternatively, translation service 44 may employ an actual person, who can be contacted by translation program 31, and who can be conferenced into the conversation between the two users and, for a fee, perform real-time translation. Translation program 31 may conference-in the translator using appropriate VoIP (Voice-over IP) protocols.

Translation program 31 may provide an electronic mail (e-mail) or text message (SMS—Short Message Service) transcript of the conversation between the two users. Text messages, of course, may not be available for longer conversations. The transcript may contain versions of the conversation in one language or in both languages. To receive these transcripts, the user(s) may register with translation program 31 via translation app 26 or by a Web site associated therewith. This registration option may be provided, e.g., at or near activation of the translation app. Translation program 31 may likewise provide real-time text messages of the translated speech to mobile device 24. For example, along with the audio data for each language, translation program 31 may provide, to the mobile device, a text message containing text that corresponds to the audio data. The transcripts may be provided to a specified computer as well.

Figure 8:
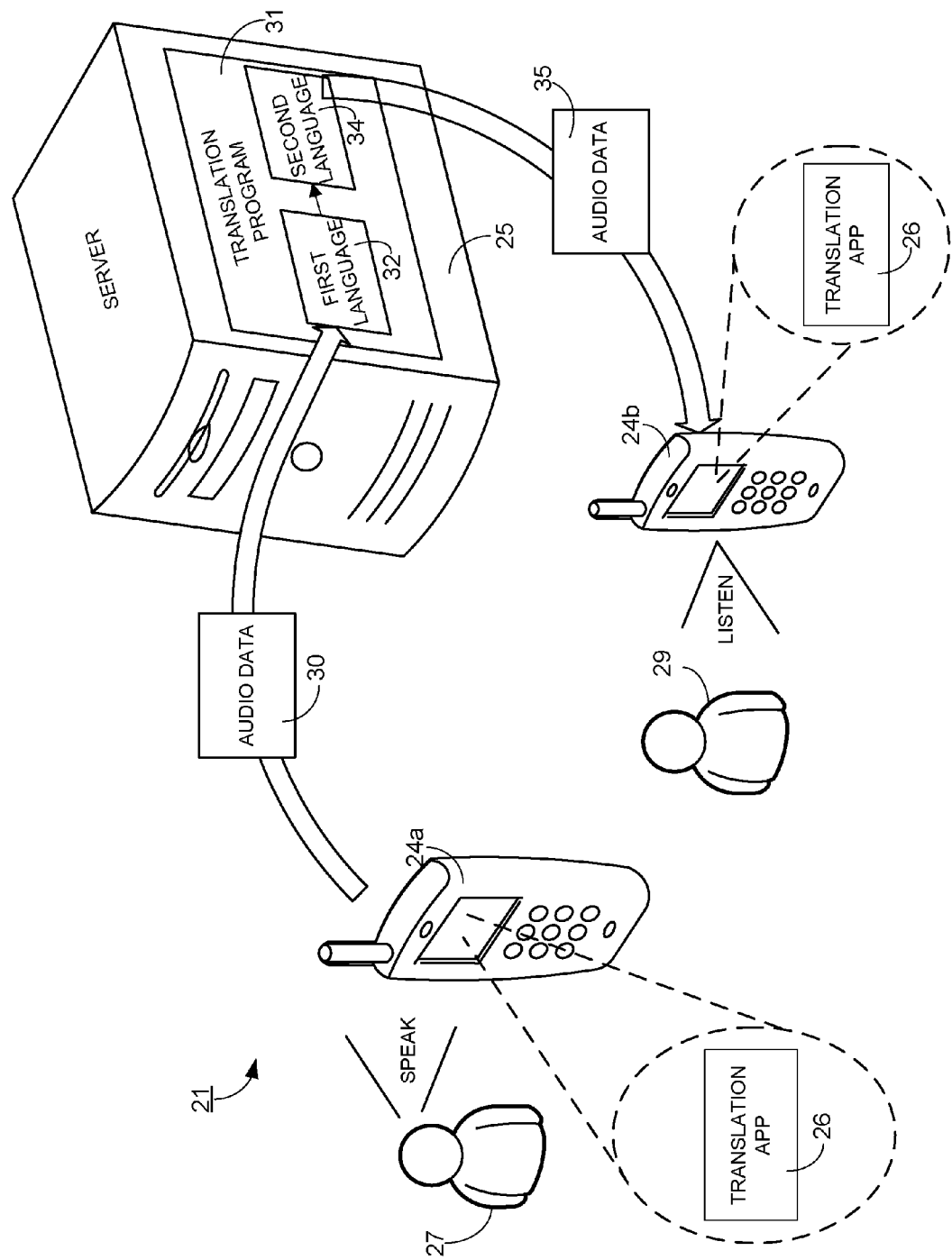
FIG. 8 is a block diagram showing, conceptually, an alternate method of using a mobile device to enable language translation.

Instead of passing a single mobile device back-and-forth between users, translation program 31 may provide a translation of speech received from one mobile device to a different mobile device. FIG. 8 is a block diagram showing this process conceptually. In FIG. 8, a system 21 includes mobile devices 24a, 24b that are in communication with each other, and with a server 25, over a network 41. Each mobile device 24a, 24b contains an instance of translation app 26 for translating between languages. In operation, each app is activated, and the mobile devices 24a, 24b are paired. Translation app 26 may be the same app described above with respect to FIG. 6, e.g., this may be additional functionality provided with translation app. Alternatively, a different translation app than app 26 may be used to provide this functionality.

The translation app may ask the users which languages to translate. The users may select, e.g., via a touch-screen menu item or voice input on their respective devices, to translate between their native languages, in this example, English and French. Alternatively, the geographic location of mobile devices 24a and/or 24b may be used to specify one or both of the languages, as described above.

To begin the translation process, user 27 speaks in his native language (e.g., English) into mobile device 24a. Mobile device 24a generates audio data 30 that corresponds to that speech, and forwards that audio data to server 25, along with the identity (e.g., the IP address) of the target mobile device 24b. Server 25 translates the audio data for the user's native language (e.g., English) into audio data 35 for the other user's (29) native language (e.g., French). This audio data 35 is provided to mobile device 24b over the network. User 29, whose native language is French, listens to audio data 35 on mobile device 24b. By using mobile devices 24b in this manner, user 29 is able to obtain a French-language translation of user 27's English-language speech. User 29 may then speak, in French, into mobile device 24b. The process may then be repeated in reverse to convert user 29's French-language speech into English-language speech, which can be played to user 27 on mobile device 24a.

Triggering translation based on receipt of a user's speech may make the translation process more user-friendly, and may reduce the amount of interaction with the translation app and mobile device.

Figure 9:
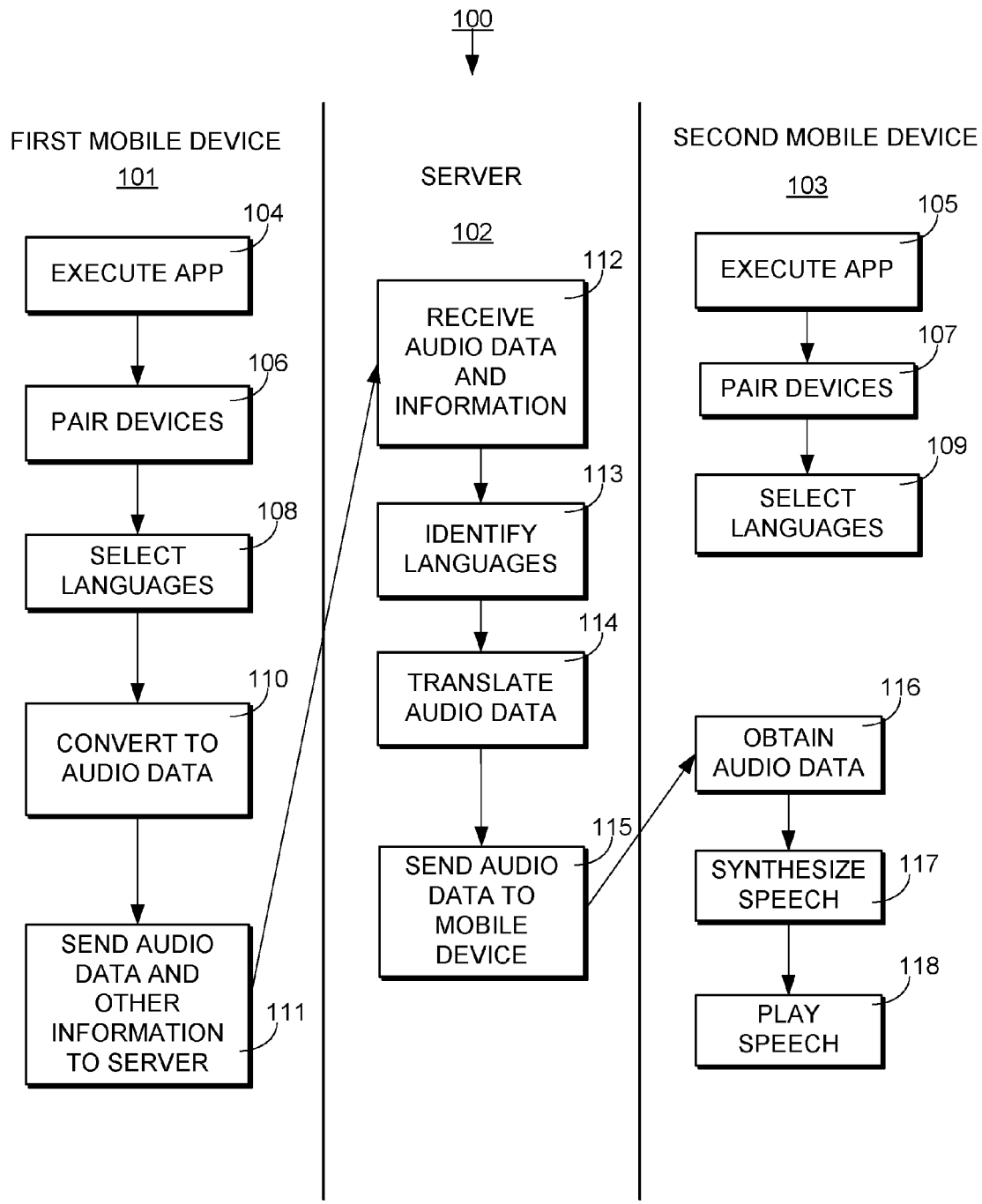
FIG. 9 is a flowchart showing a process for performing language translation according to the method of FIG. 8.

FIG. 9 is a flowchart showing a process 100 for performing language translation. In FIG. 9, process 100 is split into a left part 101, which is performed on a first mobile device 24a, and a central part 102, which is performed on server 25, and a right part 103, which is performed on a second mobile device 24b. It is noted, however, that the actions shown in FIG. 9 may be assigned differently. For example, in other implementations, actions performed by server 25 may be performed on the mobile devices, and vice versa. Some elements of process 100 are identical to those of process 68 (FIG. 6). Those elements that are the same in both figures are noted below and will be discussed only briefly here.

Referring to FIG. 9, translation apps are executed (104, 105) at each of mobile devices 24a and 24b. Thereafter, mobile devices 24a and 24b are paired (106, 107). The mobile devices may be paired, e.g., by "bumping" the two mobile devices together. Bumping uses the locations of each of the mobile devices to exchange information. Alternatively, users may pair the mobile devices manually. For example, a user may enter, into the translation app in his mobile device, the telephone number of the other mobile device, and the other user may do the same. By virtue of the pairing, each translation app 26 can obtain the identity, e.g., the IP address, of the mobile device containing the other translation app. This information can be sent by a mobile device to translation program 31, along with audio data for input speech. The server will therefore know where a translation of the audio data should be sent, e.g., to another mobile device at an IP address specified in the communication.

Users at each mobile device 24a and 24b may then enter (108, 109), into each executing translation app, the languages that are to be translated, e.g., French and English. Each user may enter both languages. For example, a user may enter his native language and the language of his counterpart at the other mobile device. Alternatively, a single user may enter both languages or one or both may be determined based on geography. In still another alternative, each user may speak into their respective device, and their languages may be identified automatically. In any case, a user 27 then initiates the translation process by speaking into his mobile device. Process 100 converts (110) that speech to audio data in the same way as in process 68. That audio data is sent (111) to server 25, along with the language selection(s) and identifier(s) for the other mobile device.

Translation program 31 in server 25 receives (112) audio data and, if applicable, language identifiers from mobile device 24*a*. Translation program 31 identifies (113) the initial and target languages in the same way as in process 68. Translation program 31 also identifies the mobile device 24*b* to which the translated audio is to be sent. This mobile device 24*b* may be identified based on any appropriate information, such as IP address or telephone number.

After translation program 31 has identified the initial and target languages and the target mobile device, the audio data from mobile device 24*a* may be translated (114). The translation may be performed in the same way as in process 68 to generate audio data in the target language. In an implementation, the generated audio data may be stored in server 25 until translation program 31 receives a request from mobile device 24*b* to retrieve the data. For example, mobile device 24*b* may react to voice or a voice command from its user. In response, mobile device 24*b* may send an instruction to server 25 to send (115) the translated audio data. In another implementation, translation program 31 may simply send the generated audio data to mobile device 24*b*. In an implementation like this, the generated audio data is stored in memory on mobile device 24*b*. The translation app on mobile device 24*b* may retrieve the audio data in response to detecting voice or a voice command.

Mobile device 24*b* thus obtains (116) the generated audio data for the target language. Its voice synthesizer uses the generated audio data to synthesize (117) speech corresponding thereto in the manner described above. The speech is then played (118) by mobile device 24*b*. The foregoing process may be repeated, except in reverse. That is, the recipient of translated speech now may speak into his mobile device. Translation program translates that speech and provides it to the original speaker, as described above. This back-and-forth process may continue unabated.

Figure 10:
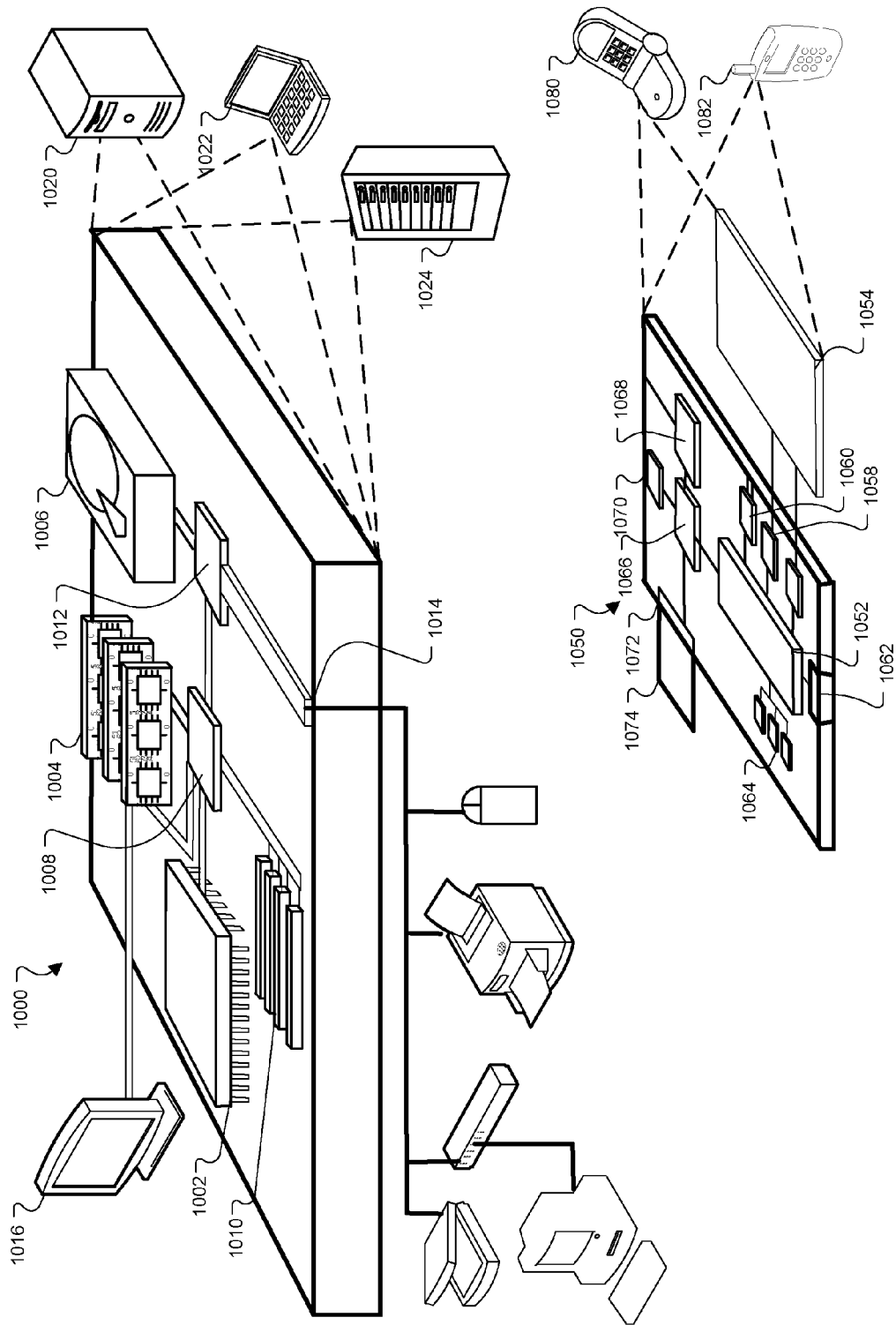
FIG. 10 shows an example of a computer device and a mobile computing device that can be used to implement the processes described herein.

FIG. 10 shows an example of a generic computer device 1000 and a generic mobile computer device 1050, which may be used to implement the processes described herein, including the mobile-side processes and/or the server-side processes. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 may implement server 25, which runs translation program 31. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a computer- or machine-readable medium, such as the memory 1004, the storage device 1006, memory on processor 1002, or a propagated signal. For example, the information carrier may be a non-transitory, machine-readable storage medium.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 may be an implementation of the mobile devices described herein. Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080, which may be used to perform the mobile device-side processes described herein. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method, performed on a mobile device, which is part of a process for translating between languages, the method comprising:
    sending, to a server, data corresponding to a first language;
    sending, to the server, data corresponding to a second language;
    generating initial audio data based on input speech, the initial audio data being in an initial language;
    sending the initial audio data to the server;
    receiving translation data that corresponds to a translation of the initial audio data, the translation data corresponding to a target language;
    storing the translation data in memory on the mobile device;
    identifying movement of the mobile device between first and second users, wherein movement of the mobile device comprises at least moving the mobile device angularly relative to a predefined reference; and
    in response to the movement of the mobile device: (a) retrieving the translation data from the memory; and (b) generating output audio data from the translation data, the output audio data comprising a translation of the input speech into the target language;
    wherein, in a case that the mobile device is in a first location, the initial language is the first language and the target language is the second language and, in a case that the mobile device is in a second location, the initial language is the second language and the target language is the first language; and
    wherein subsequent operations of the mobile device relating to translation between the first language and the second language are triggered automatically by subsequent movement of the mobile device.

2. The method of claim 1, further comprising:
    receiving first text or second text corresponding, respectively, to either the input speech in the first language or the input speech in the second language.

3. The method of claim 1, wherein at least one of the data corresponding to the first language or the data corresponding to the second language comprises a geographic location of the mobile device.

4. The method of claim 1, further comprising:
    sending a request for a different translation of the initial audio data.

5. The method of claim 1, further comprising:
    receiving language options on the mobile device; and
    outputting one or more selections from among the language options;
    wherein at least one of the initial language and the target language are based on the one or more selections.

6. The method of claim 5, wherein outputting is performed via a voice command.

7. One or more non-transitory machine-readable media storing instructions that are executable by one or more processing devices for translating between languages, the instructions being executable to perform operations comprising:
    sending, to a server, data corresponding to a first language;
    sending, to the server, data corresponding to a second language;
    generating initial audio data based on input speech, the initial audio data being in an initial language;
    sending the initial audio data to the server;
    receiving translation data that corresponds to a translation of the initial audio data, the translation data corresponding to a target language;
    storing the translation data in memory on the mobile device;
    identifying movement of the mobile device between first and second users, wherein movement of the mobile device comprises at least moving the mobile device angularly relative to a predefined reference; and
    in response to the movement of the mobile device: (a) retrieving the translation data from the memory; and (b) generating output audio data from the translation data, the output audio data comprising a translation of the input speech into the target language;
    wherein, in a case that the mobile device is in a first location, the initial language is the first language and the target language is the second language and, in a case that the mobile device is in a second location, the initial language is the second language and the target language is the first language; and
    wherein subsequent operations of the mobile device relating to translation between the first language and the second language are triggered automatically by subsequent movement of the mobile device.

8. The one or more non-transitory machine-readable media of claim 7, wherein the operations comprise:
    receiving first text or second text corresponding, respectively, to either the input speech in the first language or the input speech in the second language.

9. The one or more non-transitory machine-readable media of claim 7, wherein at least one of the data corresponding to the first language or the data corresponding to the second language comprises a geographic location of the mobile device.

10. The one or more non-transitory machine-readable media of claim 7, wherein the operations comprise:
sending a request for a different translation of the initial audio data.

11. The one or more non-transitory machine-readable media of claim 7, wherein the operations comprise:
receiving language options on the mobile device; and
outputting one or more selections from among the language options;
wherein at least one of the initial language and the target language are based on the one or more selections.

12. The one or more non-transitory machine-readable media of claim 11, wherein outputting is performed via a voice command.

13. An electronic system for translating between languages, the electronic system comprising:
one or more processing devices; and
one or more machine-readable media storing instructions that are executable by the one or more processing devices to perform operations comprising:
sending, to a server, data corresponding to a first language;
sending, to the server, data corresponding to a second language;
generating initial audio data based on input speech, the initial audio data being in an initial language;
sending the initial audio data to the server;
receiving translation data that corresponds to a translation of the initial audio data, the translation data corresponding to a target language;
storing the translation data in memory on the mobile device;
identifying movement of the mobile device between first and second users, wherein movement of the mobile device comprises at least moving the mobile device angularly relative to a predefined reference; and
in response to the movement of the mobile device: (a) retrieving the translation data from the memory; and (b) generating output audio data from the translation data, the output audio data comprising a translation of the input speech into the target language;
wherein, in a case that the mobile device is in a first location, the initial language is the first language and the target language is the second language and, in a case that the mobile device is in a second location, the initial language is the second language and the target language is the first language; and
wherein subsequent operations of the mobile device relating to translation between the first language and the second language are triggered automatically by subsequent movement of the mobile device.

14. The electronic system of claim 13, wherein the operations comprise:
receiving first text or second text corresponding, respectively, to either the input speech in the first language or the input speech in the second language.

15. The electronic system of claim 13, wherein at least one of the data corresponding to the first language or the data corresponding to the second language comprises a geographic location of the mobile device.

16. The electronic system of claim 13, wherein the operations comprise sending a request for a different translation of the initial audio data.

17. The electronic system of claim 13, wherein the operations comprise:
receiving language options on the mobile device; and
outputting one or more selections from among the language options;
wherein at least one of the initial language and the target language are based on the one or more selections.

18. The electronic system of claim 17, wherein outputting is performed via a voice command.

19. An electronic system for translating between languages, the electronic system comprising:
means for sending, to a server, data corresponding to a first language and data corresponding to a second language;
means for generating initial audio data based on input speech, the initial audio data being in an initial language;
means for sending the initial audio data to the server;
means for receiving translation data that corresponds to a translation of the initial audio data, the translation data corresponding to a target language;
means for storing the translation data in memory on the mobile device;
means for identifying movement of the mobile device between first and second users, wherein movement of the mobile device comprises at least moving the mobile device angularly relative to a predefined reference; and
means for, in response to the movement of the mobile device: (a) retrieving the translation data from the memory; and (b) generating output audio data from the translation data, the output audio data comprising a translation of the input speech into the target language;
wherein, in a case that the mobile device is in a first location, the initial language is the first language and the target language is the second language and, in a case that the mobile device is in a second location, the initial language is the second language and the target language is the first language; and
wherein subsequent operations of the mobile device relating to translation between the first language and the second language are triggered automatically by subsequent movement of the mobile device.

* * * * *